Sept. 5, 1950        P. H. SMITH        2,521,550
RADIO ANTENNA SYSTEM

Filed Feb. 28, 1946        4 Sheets-Sheet 1

INVENTOR
P. H. SMITH
BY
Harry C. Hart
ATTORNEY

Sept. 5, 1950          P. H. SMITH          2,521,550
RADIO ANTENNA SYSTEM
Filed Feb. 28, 1946          4 Sheets-Sheet 3
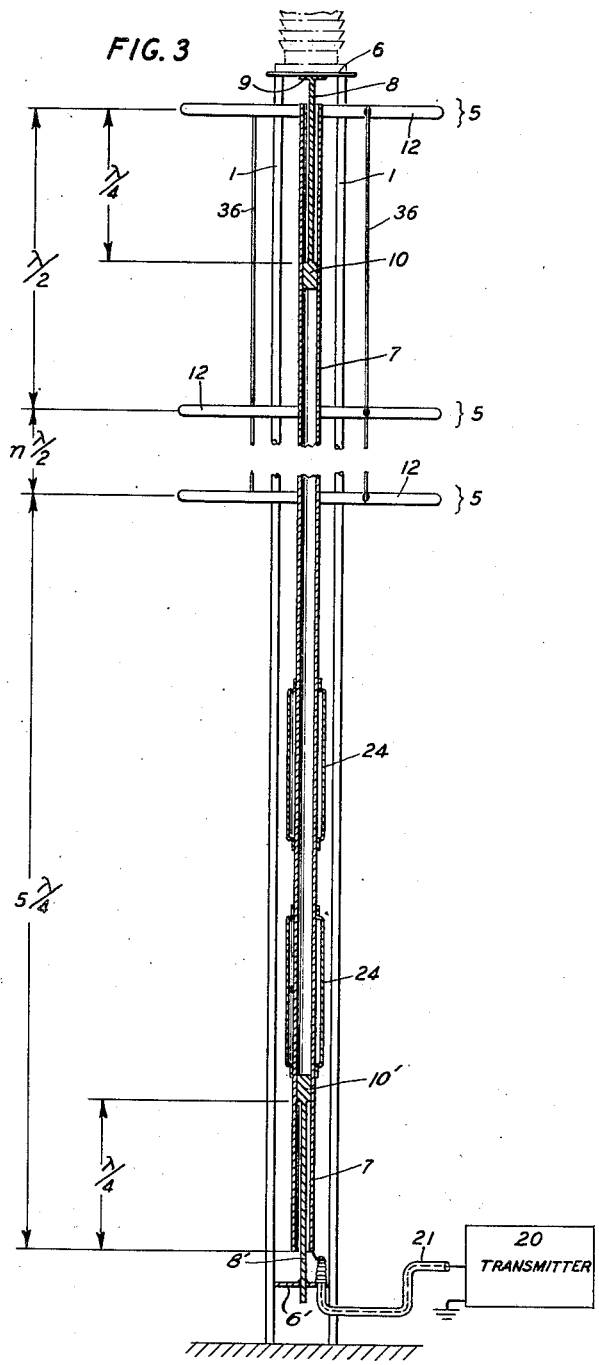
INVENTOR
P. H. SMITH
BY
Harry C. Hart
ATTORNEY Sept. 5, 1950 P. H. SMITH 2,521,550
RADIO ANTENNA SYSTEM
Filed Feb. 28, 1946 4 Sheets-Sheet 4
    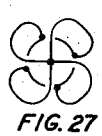 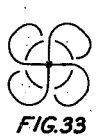
FIG.5   FIG.11   FIG.17   FIG.22   FIG.27   FIG.33
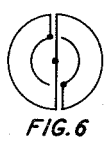 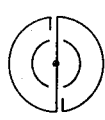    
FIG.6   FIG.12   FIG.18   FIG.23   FIG.28   FIG.34
 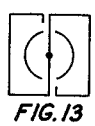   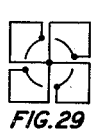 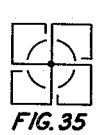
FIG.7   FIG.13   FIG.19   FIG.24   FIG.29   FIG.35
     
FIG.8   FIG.14   FIG.20   FIG.25   FIG.30   FIG.36
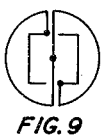 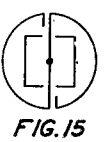    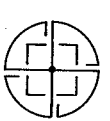
FIG.9   FIG.15   FIG.21   FIG.26   FIG.31   FIG.37
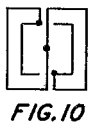    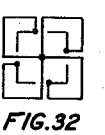 
FIG.10   FIG.16   FIG.39   FIG.40   FIG.32   FIG.38
INVENTOR
P. H. SMITH
BY
Harry C. Hart
ATTORNEY

Patented Sept. 5, 1950

2,521,550

UNITED STATES PATENT OFFICE 2,521,550

RADIO ANTENNA SYSTEM

Phillip H. Smith, Fair Haven, N. J., assignor to Bell Telephone Laboratories, Incorporated, New York, N. Y., a corporation of New York Application February 28, 1946, Serial No. 650,960

10 Claims. (Cl. 250—33.53)

This invention relates to radio antennas and particularly to a tower-supported antenna for use in the microwave, radar beacon, ultra-short and frequency modulation broadcast fields.

It is an object of the invention to secure, in a tower-supported antenna structure, horizontally polarized radiation which is non-directional in the horizontal plane and a strong, narrow beam in the vertical plane.

It is another object of the invention to provide a high frequency non-directional broadcast antenna without the necessity of feeding different component radiators in quadrature.

It is another object of the invention to provide a tower-supported antenna which shall be suitable for use at any frequency within a comparatively wide frequency band.

Another object is to suppress unwanted radiation from an antenna tower and from feed lines wherewith radiator elements are supplied.

Another object it is to provide a tower-supported antenna of simple, rugged and inexpensive construction. A related object is to provide an antenna which may easily and rapidly be assembled and erected in the field.

Still another object is to provide a tower-supported antenna in which many of the component elements do double duty as conductors and as structural members.

With the dipole antenna as a starting point, the high frequency antenna art has developed in two divergent directions. In one direction, so-called turnstile or rotating field antennas have been developed in various forms. These operate in accordance with well-established principles as set forth in Brown Patent 2,086,976. Although giving excellent azimuthal uniformity of radiation, these antennas are somewhat objectionable from the standpoint of the complexity of the circuits required to feed them with balanced voltages in quadrature. In the other direction, various forms of ring antennas have been developed, such as folded dipoles and the like. In these it is the designer's object to arrive at a configuration of conductors which shall give an effective ring of radiating current. These structures are characterized for the most part by awkwardness of the supply line connections, necessity of substantial amounts of insulation in various positions, and difficulty of providing adequate mechanical support.

The invention of this application lies in the second-named field of endeavor and provides a strong ring of radiating current with substantial simplification in the arrangements for mounting and feeding the radiators.

To this end there is provided in accordance with a preferred form of the invention, a conductive tower structure which serves both as a support for the radiator elements to be described and as the outer conductor of a coaxial line which supplies them. The outer conductor may comprise tower legs, which may be solidly grounded, and conductive supporting struts which are spaced apart by a small fraction of the operating wavelength and to serve to shield the outer space from the electromagnetic fields within. A central columnar conductor runs axially of the tower from top to foot and serves as the inner conductor of this coaxial line. The radiators may be arranged in groups, mounted on the tower at vertical spacing intervals of a half wavelength or a multiple thereof. It is a feature of this construction that all radiators are fed in parallel, with consequent simplification of supply connections. The vertical array serves to concentrate radiation in a horizontal direction and so conserves energy. Excitation may be applied from a conventional high frequency transmitter and interconnecting coaxial cable.

The radiator elements themselves are conductors, preferably of arcuate form, measuring approximately one-half wavelength from end to end. All the radiators of one radiator group lie in the same horizontal plane and curve in the same direction. All the radiators of an adjacent group lie in another horizontal plane and if, as preferred, the second group is vertically spaced one-half wavelength from the first, they all curve in the opposite direction. (For full wavelength spacing all elements curve in the same direction.) The arcuate form of the radiators is modified to the extent that one tip or end of each is extended radially inward to meet the central columnar coductor to which it is securely connected. The exact shapes of the individual radiators are varied in accordance with the number of radiators per group. That is, one radiator shape is preferred for a group of two, another for a group of three, and still another for a group of four radiators. In a broad sense, uniformity of the radiation pattern in azimuth is improved as the number of radiators per group is increased. However, the improvement due to an increase beyond four radiators in a group is slight, four giving a pattern which is substantially uniform.

The unextended ends of the radiators may be left open, if desired. However, it is preferred to connect them individually to the legs of the tower there being, in general, as many radiators in a radiator group as the tower has legs. Such connection gives added structural support.

The invention will be more fully understood from the following detailed description of a preferred embodiment thereof, taken in conjunction with the appended drawings, in which like reference numerals indicate like elements.

Fig. 1A is an enlarged perspective view of two parts of the tower of Fig. 1, disassembled;

Fig. 3 is an elevation view, partly schematic, and partly in section, of the tower-supported antenna of Fig. 1;

Figs. 5 to 40, inclusive, are diagrammatic of various radiator group configurations.

Figure 1:
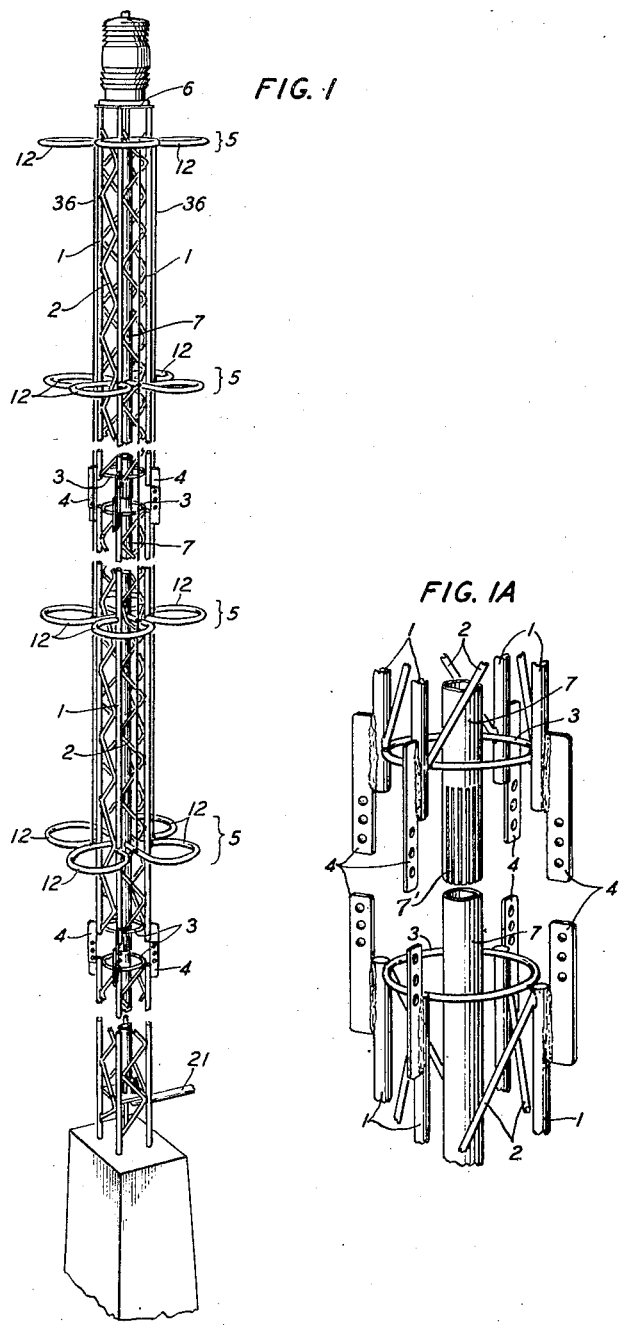
Fig. 1 is a perspective view of an antenna tower constructed in accordance with the invention for use at frequencies of the order of 100 megacycles.

Referring now to the drawings, a tower is constructed of a number, for example four, legs 1 which are preferably of strong, light, stiff material, such as galvanized iron or steel rod. The legs are provided with mutual supports and conductively connected to each other by diagonal struts 2 which may be fixed in place by welding. The tower may be fabricated in sections, approximately one wavelength long or a multiple thereof at the mean frequency contemplated, each section being provided at either end with bracing hoops 3 and with brackets or stubs 4 for ease of assembly and erection in the field, where the stubs 4 may be bolted or riveted together. For the frequency band from 88 to 108 megacycles, the mean frequency is 98 megacycles. For this frequency the wavelength along such a tower has been found to be 9 feet 8 inches, i. e., slightly less than the wavelength in free space, due to the loading effect of the diagonal struts 2. With tower sections of this length, an array of seven vertically spaced radiator groups 5 spaced one-half wavelength apart, can be mounted on the tower at the precise half wavelength intervals, barring interference with the struts, in any frequency within the range of 88 to 108 megacycles, and without having any radiator group coincide with a tower section joint. Strut interference is not serious as the bay spacing error need never exceed the radius of the element plus the radius of the strut plus a small allowance for electrical clearance. Fig. 1 shows one such section joint and Fig. 1A shows the lower end of one section separated from the upper end of an adjacent section.

At the upper end of the tower the legs may extend somewhat above the central conductor and the uppermost radiator group. These upper leg extensions may support a bridge or plate 6 from which a central columnar conductor 7, which may be of sheet metal tubing, may be hung as by a rod 8, terminated in the upper end in a flange 9 which may be bolted or welded to the bridge 6 and at its lower end in a boss or head 10 which may be welded or otherwise securely connected and fixed to the inside wall of the columnar conductor 7. A similar construction may be employed at the foot of the tower, a rod 8', terminated in a boss or head 10' secured to the inside wall of the conductor 7, being supported on a base plate 6'. In each case the junction of the boss 10, 10' with the conductor 7 should be located, as indicated in Fig. 3, at a point one-quarter wavelength removed from the end of the conductor 7.

One end 7', of each section of the columnar conductor 7 may be corrugated or split to facilitate conductive assembly with the mating end of an adjacent section.

If desired, an aircraft code beacon 11 may be mounted on the bridge 6.

For the 88–108 megacycle frequency range, the legs of a tower of the type described may be located at the corners of a one-foot square, while the central columnar conductor may be three to four inches in diameter.

The individual radiator groups 5 of the invention are mounted on the tower at intervals of approximately one half wavelength or one wavelength apart, as measured on the tower. With the four-leg tower of Fig. 1, each group consists of four radiators 12 and, in general, the number of radiators in a group may be equal to the number of legs of the tower.

Within each group, each radiator 12 consists of a metal rod or tube bent or otherwise formed into an arc, one end 13 being extended inwardly toward the central axis of the tower. These inwardly extended ends are securely connected together and to the coaxial columnar conductor 7 as by a clamp 14 (Fig. 2) while the opposite unextended ends of the respective radiators of the group are preferably securely connected, as by clamps 15 to the respective legs 1 of the tower. They may, however, be left unconnected if desired.

The arcuate radiators 12 of the uppermost group 5 all curve in the same direction. The next radiator group downward, spaced one-half wavelength from the first, is like the upper one except that its radiator arcs curve in the opposite direction. The third radiator group, spaced one-full wavelength from the first, is again identical with the first and its radiator arcs all curve in the same direction as those of the first. This reversal of direction is visible in the two lowermost radiator groups of Fig. 1 but is not required if one wavelength spacing is used.

High frequency energy may be fed to the tower-supported antenna from a high frequency transmitter 20 (Fig. 3) and by way of a conventional high frequency line, for example, a 50-ohm coaxial cable 21, to the lower portion of the coaxial columnar conductor 7, preferably at a point one and one-quarter wavelengths removed from the lowermost radiator group 5 to provide space for an impedance matching device of the type indicated. These dimensions are shown in Fig. 3. The outer conductor of the feeder cable 21 may be solidly connected to the tower legs 1 at the base plate 6'. Any suitable impedance matching device may be employed to match the impedance of the tower with its radiators to that of the incoming transmitter line 21 for example, toroidal conductors 24 of sheet metal, one-quarter wavelength along, their diameters and positions being adjusted to give the best match in accordance with principles which are known per se. This feature does not form a part of the invention.

Each individual arcuate radiator 12 of each radiator group 5 measures substantially one-half wavelength from end to end. Each radiator group is connected to the tower at a voltage loop or current node of the tower line and likewise of the arcuate radiator 12 itself.

Figure 2:
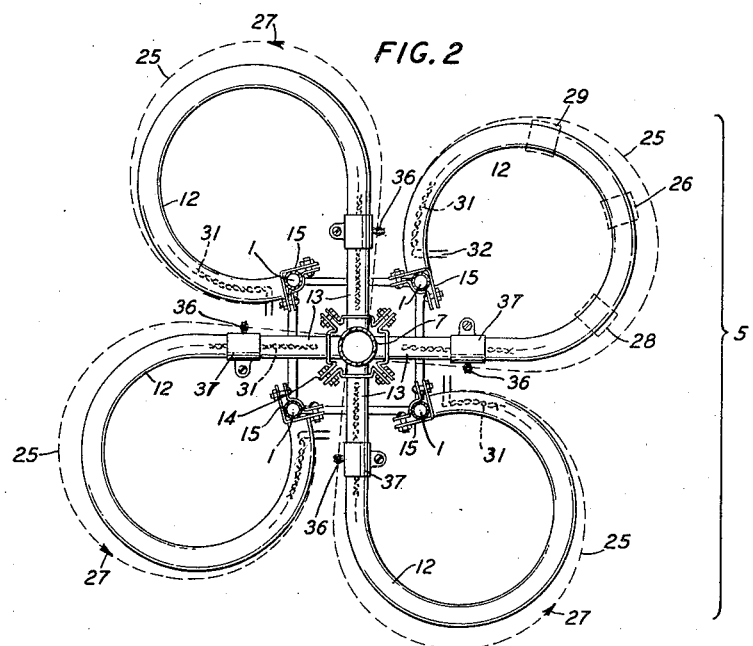
Fig. 2 is a detail view of one of the group of four radiators of Fig. 1, partly in section.

With this arrangement, individual radiator groups 5 being connected to the tower at current nodes and individual radiators being substantially one-half wavelength from end to end along the arc, a strong current will flow on the surface of each individual radiator, the distribution of which will be as indicated by the broken curves 25 in Fig. 2. Referring particularly to Fig. 2, it will be observed that a region 26 of each radiator element 12 of a single group which is at or near the mid-point of this element is a region of maximum current, and that, as indicated by arrows 27, these maximum currents are all additive in a peripheral or circuital direction, thus giving rise to an effective ring of current around the tower. In another portion 28 of the radiator element, closer to one end of the element or the other, the current which flows has both a peripheral component and a radial component. For this element there can always be found a neighboring element 29, having the same peripheral current component and an equal and opposite parallel radial current component. Thus while the peripheral components are additive the radial components are subtractive which substantially reduces the radiation from the inner portions of the radiator elements in undesired directions to negligible proportions.

The radiator elements of the invention lend themselves readily to the inclusion of appropriate sleet-melting heating elements, as does the tower of the invention to the furnishing of low frequency sleet-melting power to such elements. Thus, referring to Fig. 2, a conventional heating element 31 may be inserted within the arcuate tubular radiator 12 and low frequency power leads 32 may be brought out through a hole in the radiator wall adjacent a tower leg 1 and then downward to the ground where they may be supplied from any suitable source. If desired, the tubular radiator 12 may itself form a part of the sleet-melting circuit by means of a construction such, for example, as that described in United States Patent 2,350,916 to J. F. Morrison.

Figure 4:
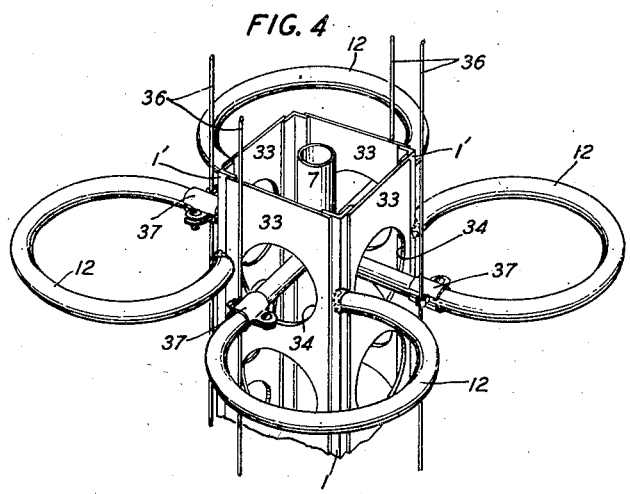
Fig. 4 is a perspective view of a part of an alternative arrangement to the tower-supported antenna of Fig. 1.

Fig. 4 shows an alternative construction for the tower in which the struts 2 of Figs. 1 and 1A which give mutual support to the legs are replaced by metal sheets 33 which may be perforated as shown to reduce weight and wind resistance. With this construction the legs themselves may be of lighter material than the legs of Figs. 1 and 3 and may indeed be conventional metal strips 1' of angular cross-section. The sheets 33 and legs 1' may be fastened together by welding or in any other convenient manner, and the extended straight portion of each radiator element 12 may be clamped to the inner columnar conductor 7 as shown in Fig. 2 and may extend outward of the tower through a suitably placed hole 34 in the sheet metal wall. The opposite end of the radiator 12 may be clamped or otherwise fixed to the tower leg 1' in any desired manner, or if desired, it may be left free.

The invention is not limited to the use of a radiator group of four radiators, nor to individual radiators of the preferred form of Fig. 1. Figs. 5 to 40 show groups of two, three, four and six radiators of various configurations. In each of these figures the inner broken circle, triangle, or square indicates the plan view of the tower, whatever its construction, while the outer arcs or squares are schematic representations of the configurations of one radiator group. It will be observed that features common to all of these arrangements are that a substantial part of the length of each radiator lies in an approximately circular arc, that all of the arcs curve in the same angular direction, i. e., clockwise or counter-clockwise, that one end of the arc is extended radially inward, and that the extended ends are all connected together and to the central columnar conductor while the opposite ends are separately available for connection to the respective legs of the tower, the tower having, in general, as many legs as the radiator group has radiators.

Furthermore, if desired and if considered advantageous to do so, slightly greater radiation efficiency may be gained, especially if the number of elements per group is small, by departing somewhat from the exact radiator shape of Fig. 2 and arranging that as great as possible a fraction of the length of each radiator shall lie along the circumference of the circumscribing circle. This construction is schematically illustrated, for example, in Fig. 6. Tests have shown, however, that the gain in uniformity of the horizontal radiation pattern from this configuration is insufficient to offset the considerable reduction in ease of manufacture and mechanical strength and stability which characterize the circular arc of the preferred form.

Figs. 5 to 10 show radiator groups of two elements, the inner ends of the elements being connected in common to the central columnar conductor and the outer ends to the tower legs, while Figs. 11 to 16 show the same configurations with the outer radiator ends unconnected. In each case the tower may be of circular cross-section or of rectangular cross-section or, indeed, of any cross-section found convenient from the structural standpoint. As stated above, when the number of elements per group is small, it is desirable in order to avoid directional radiation that the outer portions of the radiators extend through wider arcs than is possible with the preferred form illustrated in Figs. 1 and 4. Figs. 5 to 16 illustrate this feature. From the standpoint of non-directional radiation, Figs. 6, 9, 12 and 15 are ideally the best, though small departures from this ideal, as illustrated in Figs. 5, 8, 11 and 14 have been found in practice to be justified by the greater strength and ease of fabrication and mounting which they afford.

As is well known, at great distances from an antenna the exact shapes of the elements have less effect on the radiation pattern than does their spatial distribution. Accordingly, the radiators themselves may if desired depart still further from the preferred form and consist of straight legs joined at sharp angles or corners. Such configurations are illustrated in Figs. 7, 10, 13 and 16. They may under some conditions offer structural advantages.

Figs. 17 to 26 illustrate similar configurations for a radiator group of three radiators. The square cross-section tower does not lend itself to combination with groups of three radiators and so that configuration has been omitted from the drawing. However, the square tower lends itself well to combination with a four-radiator group, either of curved radiators or of angular radiators. The former are shown in Figs. 30, 31, 36 and 37, while the latter are shown in Figs. 32 and 38. A round tower with angular radiators is shown in Figs. 29 and 35. In Figs. 27 to 32 the radiators are connected to the tower at their outer ends, while in Figs. 33 to 38 the outer ends are free.

Fig. 39 shows a group of six radiators of the ideal form while Fig. 40 shows a group of six radiators which departs from this ideal in the direction of the practical compromise of the invention. The reduction in uniformity of the radiation pattern due to such departure is negligible with as many as six radiators per group.

With the arrangements of the invention, it is evident that all radiator elements of all radiator groups are fed electrically in parallel. This offers the advantage that all elements are supplied with the same voltage, disregarding certain end effects at the upper and lower ends of the tower. Furthermore, the individual radiator elements being fed from both ends, their impedances as seen from the tower-line are very high and the currents in the mid-portions of the circumferential arcuate portions of the radiator arcs tend to remain at the same points independent of variations in the frequency, and therefore in the wavelength, of the energy supplied to them. In addition, the current maxima tend to remain in substantially the same circumferential parts of all the radiator arcs independent of mutual impedance, because the central part of each arcuate radiator is removed by one-quarter wavelength from the driving voltage.

Because of the electrically unbalanced fashion in which the radiators are fed from the tower and columnar conductor combination, regarded as a coaxial feed line, longitudinal currents may flow in the outer surfaces of the tower legs and struts of Fig. 1 and walls of Fig. 4. These currents may give rise to undesired vertically polarized radiation from the tower itself. Such radiation represents wasted power because the axes of its major lobes lie in directions which are not normal to the tower.

In accordance with a further feature of the invention such undesired radiation is suppressed by the provision of a neutralizing conductor, suitably dimensioned, located and supplied with current of proper magnitude and phase, in particular of equal amplitude and opposite phase, to the currents causing the undesired radiation. For a tower constructed and dimensioned for frequencies of 88–108 megacycles, it has been found that both the correct location and the correct supply may be obtained with a straight wire 36 of approximately one-quarter inch diameter, running vertically from top to foot of the antenna array and at a distance of a small fraction of a wavelength from the side or wall of the tower (in Fig. 1 from the plane of the diagonal struts), attached to the radiator elements 12 as by clamps 37 at a succession of points vertically spaced one above the other. Thus the "North" side of the tower has associated with it a wire connected to and fed from corresponding points of the "North" radiators of all groups, while the "South" side of the tower has associated with it a similar wire, similarly connected to corresponding points of the "South" radiators of all groups. "East" and "West" wires are similarly provided. (In the above, the points of the compass are employed in a relative sense and for identification of locations on the tower only. The tower as an assembly may of course be mounted in any desired orientation.)

In the preferred tower construction, for wavelengths of the order of 9 to 10 feet, the tower legs may be spaced approximately one foot apart, the conductor 7 being three to four inches in diameter. Thus the suppressor wires, when spaced approximately 4½ inches from the tower wall are fed from points of the arcuate radiators which are 9 inches or about one-twelfth wavelength from the conductor 7 while they are only 4½ to 6 inches or about one-twentieth wavelength from portions of the tower i. e., legs and diagonal struts, whose undesired radiation they are designed to suppress.

Thus the preferred construction of the invention lends itself admirably to the provision of undesired radiation suppressors of effective performance and of the simplest possible construction.

If desired, the tower may be provided in addition with one or more radio frequency chokes of known construction which serve to reduce the undesired currents in its external surfaces. Such elements are well known.

There has been described a tower-antenna construction which is simple to fabricate and assemble, simple to energize in which an exceptionally large number of individual elements do double duty as structural members and as electric conductors, and which gives rise to horizontally polarized radiation of a pattern which is substantially non-directional in azimuth.

Modifications of the structures described, and within the spirit of the invention which is defined in the appended claims, will occur to those skilled in the art.

What is claimed is:

1. A radio antenna comprising a tower having four symmetrically spaced vertical legs, mutually supported and interconnected by struts, a columnar conductor coaxial with said tower and supported therefrom, a vertically spaced array of like radiator groups, each group comprising four radiators, each radiator having a pair of ends or terminals and the major part of the length of each radiator being formed into a substantially arcuate wide loop, one end of each radiator being connected to said coaxial columnar conductor and the other end of said radiator being connected to a tower leg.

2. A radio antenna comprising a tower having four symmetrically spaced vertical legs, mutually supported and interconnected by struts, a columnar conductor coaxial with said tower and supported therefrom, a vertically spaced array of like radiator groups, each group comprising four radiators, each radiator having a pair of ends or terminals and the major part of the length of each radiator being formed into a substantially arcuate wide loop, one end of each radiator being connected to said coaxial columnar conductor.

3. A radio antenna comprising a coaxial line having an outer conductor and an inner conductor, said outer conductor comprising a tower having four symmetrically spaced vertical legs mutually supported and interconnected by conductive members, said inner conductor being positioned coaxially inside said tower and supported therefrom, four radiators each having an outer arcuate portion formed into a substantially circular open loop and comprising a major part of the length of said radiator, and a substantially straight portion extending radially inward of said tower, the four arcuate portions being connected to different legs of said tower and the straight portions being connected to said inner conductor, the four arcuate portions curving in the same direction from said inner conductor, and a plurality of conductors connected to intermediate points of said radiators and extending parallel to said legs for suppressing radiation from said tower.

4. A radio antenna comprising an unbalanced line, said line comprising a metallic tower having a plurality of symmetrically spaced vertical legs and a columnar conductor coaxial with said tower and supported therefrom, a pair of similar array of like radiator groups spaced apart vertically one-half wavelength substantially and each comprising a plurality of balanced radiators, each radiator being formed over its major portion into a substantially circular arc and having an extended straight portion, all of said radiators of one group lying in a horizontal plane and curving in a clockwise direction in said plane, all of the radiators of the other group lying in a horizontal plane and curving in a counter-clock-wise direction in said plane, the extended straight portions of all radiators of all groups being connected to said columnar coaxial conductor and the other ends of all radiators of all groups being connected to said tower legs, and a plurality of conductors connected to intermediate points of said radiators and extending parallel to said legs for suppressing radiation from said tower.

5. In combination, an antenna system comprising a supporting tower, a columnar conductor coaxial with said tower, a plurality of radiators attached to said tower, said tower and columnar conductor comprising a coaxial transmission line for supplying energy to said radiators, and means for suppressing radiation from said tower which comprises a conductor arranged parallel to said tower and attached to a radiator intermediate the radiator ends.

6. In combination, an antenna system which comprises a supporting tower, a plurality of radiators attached to said tower and vertically spaced from one another by an integral number of half wavelengths, at least one point of all of said radiators lying in a vertical plane, and means for suppressing radiation from said tower which comprises a conductor arranged parallel to said tower and attached to said points of said radiators.

7. In combination, an antenna system comprising a transmission line, a plurality of radiators attached to said line, a conductor arranged parallel to said line and at a small fraction of a wavelength therefrom, said conductor being attached to a radiator at a point intermediate the radiator ends such that currents in said conductor supplied thereto from said radiator are of equal magnitude to and of opposite phase from undesired currents in said line whose radiation is to be suppressed.

8. In combination, an antenna system which comprises a supporting tower, a columnar conductor coaxial with said tower, a plurality of radiator groups attached to said tower, vertically spaced apart by an integral number of half wavelengths and supplied by said coaxial conductor, each group comprising a plurality of arcuate radiators in the same horizontal plane, each radiator being substantially one-half wave in length from end to end, and means for suppressing undesired radiation from external portions of said tower which comprises a plurality of conductors, each arranged parallel to said tower and attached to corresponding points of one radiator of each group, the attachment point to each radiator being intermediate the radiator ends.

9. A radio antenna which comprises a tower having a plurality of symmetrically spaced vertical legs, a conductive member interconnecting said legs at one end of said tower, a hollow columnar conductor coaxial with said tower, a conductor rod fixed and connected to said interconnecting member and extending inwardly of one end of said columnar conductor to a point one quarter wavelength from the end of said columnar conductor and being there attached to the inside wall of said columnar conductor but being elsewhere insulated therefrom, a plurality of like radiator elements fixed to said columnar conductor and supplied with high frequency current therefrom, a source of high frequency voltage, and means for applying the voltage of said source between said end of said columnar conductor and said interconnecting member.

10. In combination, an antenna system comprising a vertical unbalanced coaxial transmission line, a balanced horizontal radiator for emitting horizontally polarized waves, said radiator having terminals directly connected across said line, and means for canceling the vertically polarized radiated waves resulting from the unbalance current produced on said line by said balanced radiator, said means comprising a vertical conductor positioned adjacent to said line and attached to said horizontal radiator at a point intermediate said terminals, the location of said point being dependent upon the amplitude and phase of said unbalance current.

PHILLIP H. SMITH.

REFERENCES CITED

The following references are of record in the file of this patent:

UNITED STATES PATENTS

| Number | Name | Date |
|---|---|---|
| 1,483,860 | Bronk | Feb. 12, 1924 |
| 2,175,254 | Carter | Oct. 10, 1939 |
| 2,190,816 | Wheeler | Feb. 20, 1940 |
| 2,267,550 | Brown | Dec. 13, 1941 |
| 2,289,856 | Alford | July 14, 1942 |
| 2,298,449 | Bailey | Oct. 13, 1942 |
| 2,323,641 | Bailey | July 6, 1943 |
| 2,324,462 | Leeds et al. | July 13, 1943 |
| 2,338,564 | Aram | Jan. 4, 1944 |
| 2,391,026 | McGuigan | Dec. 18, 1945 |
| 2,400,937 | Maddock | May 28, 1946 |
| 2,405,123 | Fyler | Aug. 6, 1946 |

FOREIGN PATENTS

| Number | Country | Date |
|---|---|---|
| 338,982 | Great Britain | Dec. 1, 1932 |
| 388,072 | Germany | June 9, 1924 |